July 22, 1924.
B. D. CHAMBERLIN
AERIAL CAMERA
Filed Feb. 16, 1922
1,502,173
3 Sheets-Sheet 1
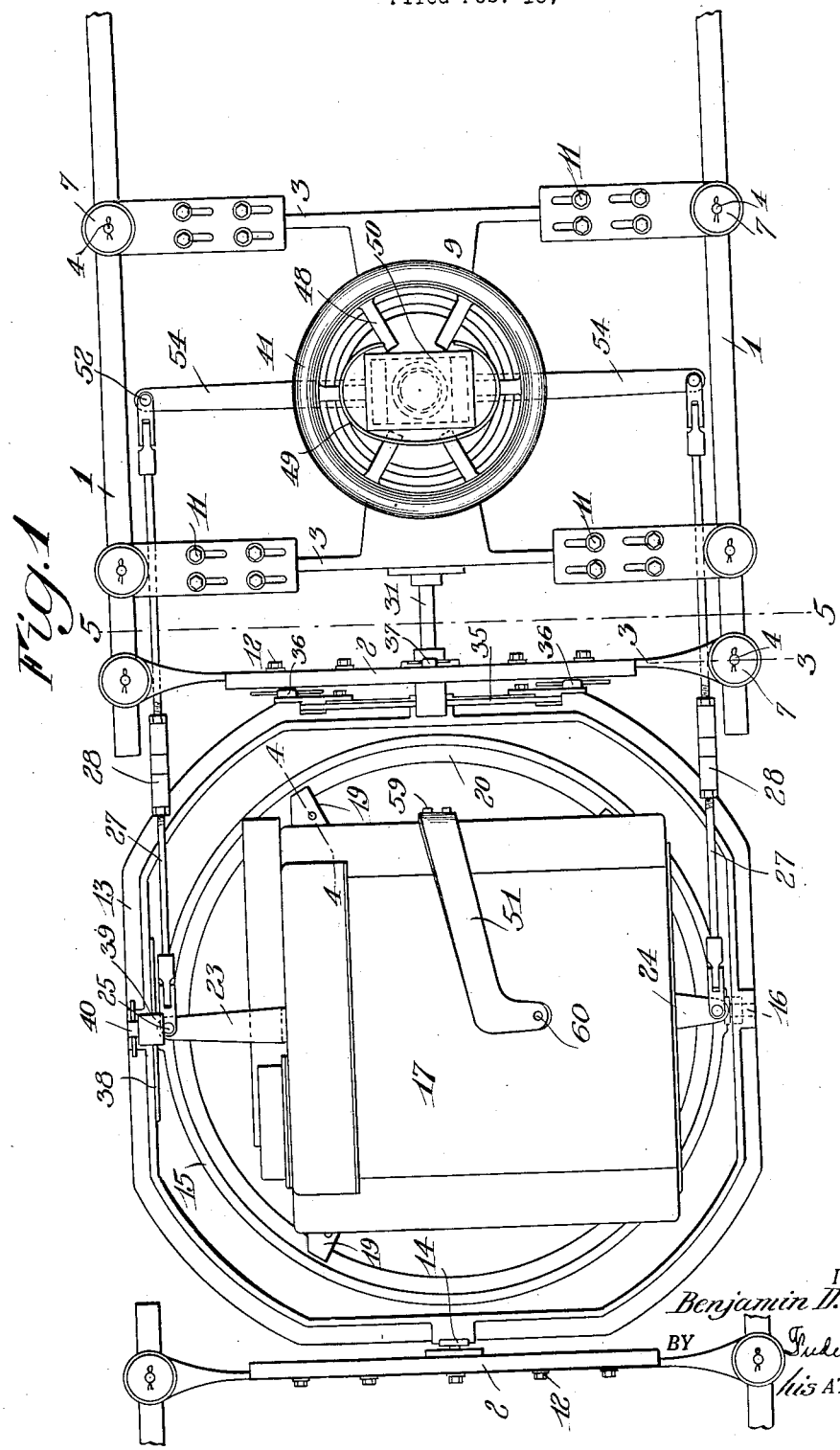

July 22, 1924.
B. D. CHAMBERLIN
AERIAL CAMERA
Filed Feb. 16, 1922
1,502,173
3 Sheets-Sheet 2
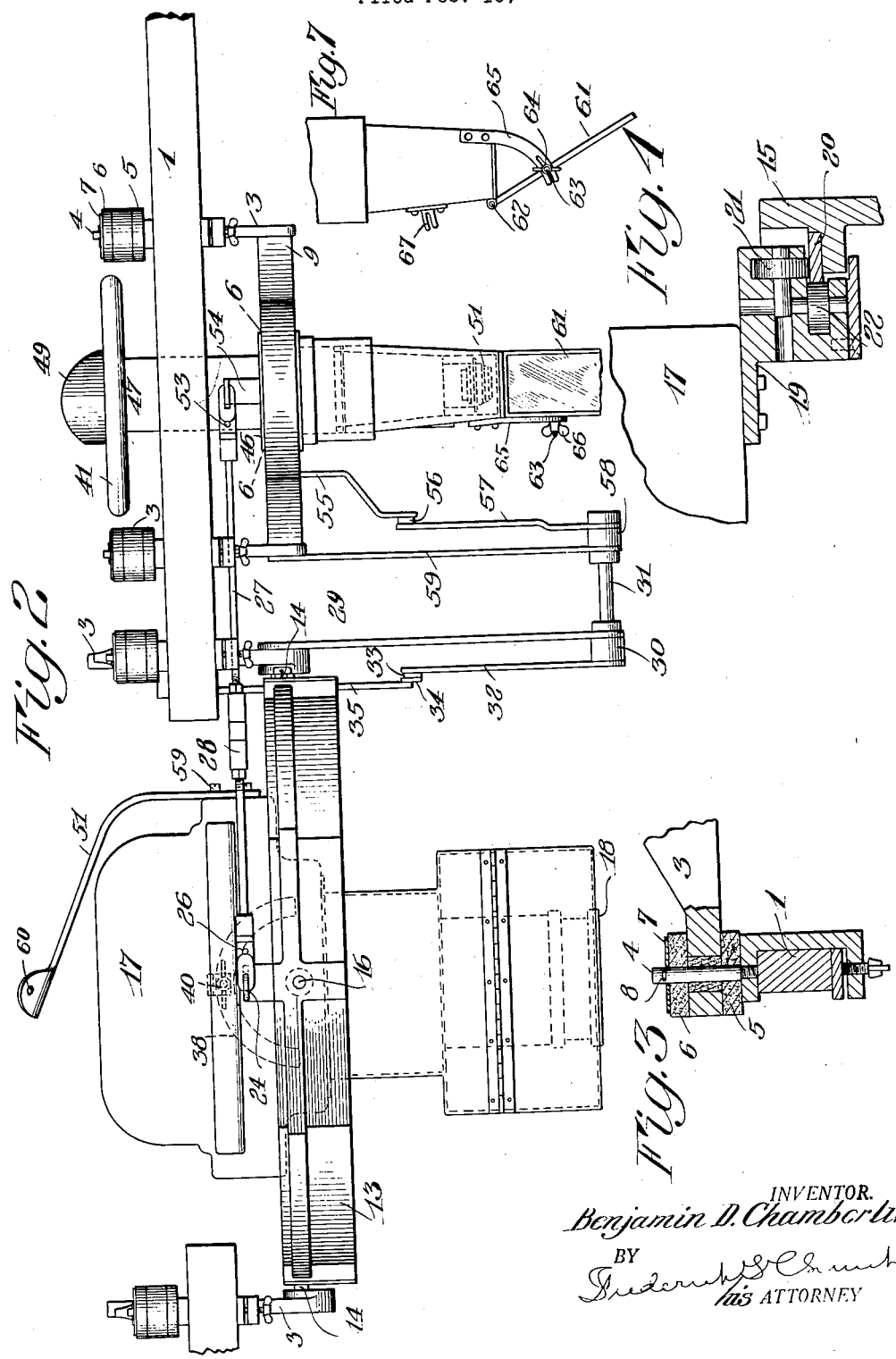
INVENTOR.
Benjamin D. Chamberlin
BY
his ATTORNEY July 22, 1924.
B. D. CHAMBERLIN
AERIAL CAMERA
Filed Feb. 16, 1922
1,502,173
3 Sheets-Sheet 3
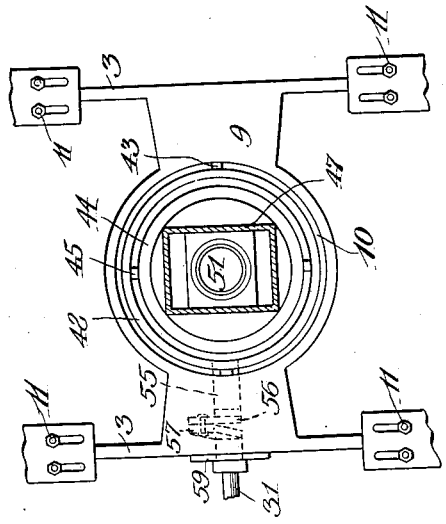
INVENTOR
Benjamin D. Chamberlin
BY
his ATTORNEY Patented July 22, 1924.

1,502,173

UNITED STATES PATENT OFFICE.

BENJAMIN DAY CHAMBERLIN, OF ROCHESTER, NEW YORK, ASSIGNOR TO EASTMAN KODAK COMPANY, OF ROCHESTER, NEW YORK, A CORPORATION OF NEW YORK.

AERIAL CAMERA.

Application filed February 16, 1922. Serial No. 537,099.

*To all whom it may concern:*

Be it known that I, BENJAMIN D. CHAMBERLIN, of Rochester, in the county of Monroe and State of New York, have invented certain new and useful Improvements in Aerial Cameras; and I do hereby declare the following to be a full, clear, and exact description of the same, reference being had to the accompanying drawings, forming a part of this specification, and to the reference numerals marked thereon.

My present invention relates to photography and more particularly to aerial cameras of the type designed to take panoramic views from an aeroplane and it has for its object to improve features of such a camera relating to the method of mounting it and controlling it as it is moved about to select the view. A further object of the invention is to provide, in conjunction with such a mechanism, a simple and convenient view finder associated with the controlling member and having its movements correlated with those of the camera whereby the operator may both view his object and operate his camera from a seat arranged at a distance therefrom. To these and other ends the invention resides in certain improvements and combinations of parts all as will be hereinafter more fully described, the novel features being pointed out in the claims at the end of the specification.

In the drawings:

Figure 1 is a plan view of an aeroplane camera and its controlling mechanism and supports all constructed in accordance with and illustrating one embodiment of my invention;

Figure 2 is a side view thereof;

Figure 3 is an enlarged detail section through one of the supporting cushions taken on the line 3—3 of Figure 1;

Figure 4 is an enlarged detail section through one of the camera supporting brackets and its track taken substantially on the line 4—4 of Figure 1;

Figure 5 is a transverse section looking forwardly on the line 5—5 of Figure 1;

Figure 6 is a fragmentary section taken on the line 6—6 of Figure 2, and

Figure 7 is a fragmentary front view of the lower end of the view finder.

Similar reference numerals throughout the several views indicate the same parts.

To first give the general plan of the mechanism shown and hereinafter more specifically described, I provide an aeroplane body having suitable openings in its bottom with a frame carrying a camera in a position in which its optical axis is substantially vertical. The camera is rotatably mounted upon a system of supporting elements which also give it a universal tilting movement in vertical planes. On the same frame but at a distance from the camera is a rotary controlling wheel adjacent to the operator's intended position which wheel turns on a vertical axis that is also adapted for universal tilting movement. This controlling or operating wheel and the camera are so connected up that their movements are correlated and as the operating mechanism is manipulated, the camera is caused to follow the same movement, the optical axis of the latter and the turning axis of the operating member being at all times parallel. A view finder associated with the operating member has its optical axis substantially coincident with the turning axis of said member so that the operator, in controlling the movements of the camera, may conveniently view the ground beneath on substantially the same line of sight as that of the camera lens and choose his views accordingly.

Referring more particularly to the drawings, 1 indicates the side rails of a horizontal frame arranged within the body of an aeroplane above suitable openings in the bottom thereof, the aeroplane itself not being herein shown. Cross rails 2 connect these side rails and support the camera mechanism while similarly arranged cross rails 3 support the controlling mechanism. A cushioning connection for the rails, to assist in preventing undue vibration of the camera, is shown in Figure 3 and comprises a pin 4 on a rail 1 passing through an opening in the end of one of the cross rails 3 with a rubber buffer pad 5 below the latter through the medium of which it rests upon the rail 1 and a similar cushion 6 above it and confined between it and a washer 7 held on the pin by a cotter pin 8.

The cross rails 3, as best shown in Figure 6, are preferably cast together and connected by a web 9 having a circular opening 10 therein for a purpose hereinafter described and they are made extensibly adjustable by being formed in several pieces having slot and bolt connections indicated generally at 11. The cross rails 2 are similarly made adjustable by being formed from a plurality of pieces having slot and bolt connections indicated generally at 12.

A supporting frame 13 is pivoted by means of suitable trunnions 14 in bearings in the cross rails 2 to turn on a horizontal axis extending longitudinally of the main frame and thus tilt in a vertical plane transversely of the frame. Within this frame 13 is a circular frame 15 having trunnions 16 by means of which it is pivoted in bearings in the frame 13 to turn on a horizontal axis transversely of the frame 1 so that it tilts in a vertical plane normal to the plane of tilting of the outer frame 13. Within the inner frame 15 is arranged a camera box indicated generally at 17 with its optical axis vertical, the lens tube thereof being indicated at 18 in Figure 2, whereby it will be seen that the camera is given a universal tilting movement in all planes common to its axis. The camera is also rotatable upon the frame 15 by which it is immediately supported at four points through the provision of bearing brackets 19 one of which is shown in detail and enlarged in Figure 4. As shown in the latter figure, the frame 15 is L-shaped in cross section and provided with a circular track 20. Rollers 21 and 22 carried in suitable bearings in the brackets 19 engage, respectively, on the top and on the inner periphery of this ring or track 20 to respectively bear the weight of the camera and the lateral thrusts thereof. Laterally extending horizontal bracket arms 23 and 24 on the camera box are connected by universal joints the pivots of which are indicated at 25 and 26 to pull rods 27 extending rearwardly from the camera to the controlling mechanism hereinafter described, such pull rods being preferably fitted at intermediate points with turn buckles 28 to regulate their lengths. It will be seen that by operating these pull rods in opposite directions, the camera may be rotated on the frame 15 and by operating them both in the same direction, the frame 15 may be tilted on the outer frame 13 to sweep the axis of the camera in a vertical plane longitudinally of the frame.

Depending from one of the cross rails 2 is a supporting arm 29 rigid therewith and carrying at its lower end a bearing 30 for a short horizontal shaft 31. Fixed on this shaft is a crank 32 pivotally connected by a link 33 with an arm 34 depending from the outer camera frame 13 from which it will be seen that movement of this crank 32 will rock the frame 13 and the camera in the plane heretofore described. A ring 35 of which the arm 34 heretofore described is a part, is carried on the frame 13 to which it is adjustably clamped in a vertical transverse plane by suitable hand screws 36 which latter are provided to permit the frame 13 to be adjusted to a true horizontal position in relation to the controlling mechanism in the first instance as in setting up the apparatus on an aeroplane. The camera and its frames 13 and 15 are very heavy and cannot always be accurately balanced so in order to prevent them from whipping about when the device is not in use or the operator is not at the controlling wheel hereinafter described, I provide a hand screw 37 on the arm 29 having a clamping engagement with the ring 35 which holds the outer ring 13 immovable at the operator's will and I also provide a sector 38 on the frame 13 on which travels a clamping box 39 fixed to the inner frame 15 and embodying a hand screw 40 that may be tightened on the segment to similarly lock the inner frame in a fixed position.

The controlling devices for the camera include an operating member in the present form of a wheel 41 mounted in the following manner:

Within the circular opening 10 of the web 9 is an outer annular frame 42 pivoted by trunnions 43 in the web to tilt by means of trunnions 43 in the web to tilt transversely of the frame in a vertical plane exactly in the manner of the camera supporting frame 13 and on an axis parallel with or alined with that of the frame 13. Within this annular frame 42 is a second annular frame 44 having trunnions 45 by means of which it is pivoted to the frame 42 to tilt in a manner corresponding with the inner camera supporting frame 15. Rotatable on the inner ring or frame 44 by means of embracing flanges 46 is a tubular column 47 to which the wheel 41 is rigidly attached by the spokes 48 and at the upper end of the tube or column in the center of the wheel is a focusing hood or eye-piece 49. The column 47 constitutes a focusing tube or view finder, the upper end adjacent the eye-piece 49 being fitted with the usual ground glass or other image reflecting screen 50 and the lower end with a lens and lens tube as indicated in dotted lines at 51 in Figure 2. The optical axis of this view-finding device being coincident or substantially coincident with the turning axis of the wheel 41, the rotary movements of the latter do not disturb the view nor carry it off center, but merely rotate the field of the image about its center. These movements are communicated in the same degree to the camera 17, the axis of which is parallel to the axis of the view finder so that the same image is cast by the camera lens as is cast by the view finder lens upon the ground glass 50. For this purpose, the pull rods 27 connected to the camera are connected at their rear ends through a second set of universal joints having pivots 52 and 53 to laterally extending arms 54 on the column 47 parallel with the arms 23 and 24 of the camera.

By rocking the column 47 and wheel 41 back and forward and operating both of the pull rods 27 equally in the same direction on the trunnions 45 of inner frame 44 of the controlling device, the camera is swung back and forth on the trunnions 16 of its inner ring 15 to the same degree, the axes of the camera and view finder still remaining parallel. When the column 47 by means of the operating wheel 41, is rocked laterally on the other horizontal axis supplied by the trunnions 43 of outer frame 42, the camera 17 is rocked correspondingly on the trunnions 14 of its outer frame 13 through a downwardly extending arm 55 on controlling frame 42 which is pivotally connected by a short link 56 with the upper end of a crank arm 57 fixed to shaft 31. The latter shaft, in addition to the bearings 30, is supported in bearings 58 carried at the lower end of a depending arm 59 on one of the cross rails 3.

If it is convenient or desirable because of the size or construction of a particular aeroplane body to have the camera mechanism and the controlling mechanism separated to a greater degree than that shown, this may be accomplished by lengthening the pull rods 27 and substituting a longer shaft at 31.

It is sometimes desired in aerial photography to take views off to the side in partial elevation at a fairly wide angle instead of substantially straight down in plan view. My camera is preferably fitted with attachments for this purpose that enable the operator to tilt the camera and still maintain his view finder substantially vertical for easy observation while preserving the previous coordinated control. They consist in the present instance, on the part of the camera 17, in an auxiliary, offset, upwardly and laterally extending arm 58 fastened to a side of the camera at 59 and extending forwardly a little to one side of the center of the top thereof, this shape being given to prevent it from interfering with manipulations of the devices usually termed the "camera back," but arranged at the top of the instrument in the present instance. The arm terminates in an eye 60 shaped in like manner to the bracket arm 24 and adapted to be substituted therefor in connection to the adjacent pull rod 27 after the camera has been partially rotated or tilted on the ring 35 by loosening and then tightening the screw 37 with the axis of the lens at the desired angle. The other pull rod 27 is simply disconnected and the tilting, as will be seen, occurs on the trunnions 14 of the outer ring 15.

To direct the view of the view finder 47 into parallelism with this new adjustment of the camera lens while maintaining the view finder vertical, the lower end of the latter, as shown in Figures 2 and 7, is fitted with a swinging mirror 61 pivoted at one side thereof as shown at 62. A lateral stud 63 at one side of the mirror frame is received within the bifurcated end 64 of a bracket arm 65 depending from the finder and secured with a thumb nut 66 to hold the mirror at such angle that it will reflect into the vertical finder an image received at the same angle as that received by the camera lens. In accordance with the laws of reflection, the angle of the finder mirror to the axis of the finder will always be half of the angle of the camera lens to that axis.

When not in use, the mirror 61 is swung up into an inoperative position at one side of the finder body in which it is similarly held in a similar bifurcated bracket 67.

I claim as my invention:

1. In an aerial photographic apparatus, the combination with a horizontal frame and a universally movable camera mounted therein with the axis of its lens vertically disposed, said camera being adapted to rock in two vertical planes normal to each other, of a vertically disposed controlling device therefor similarly mounted in the frame and connections between the controlling device and camera for communicating the movements of the former to the latter.

2. In an aerial photographic apparatus, the combination with a horizontal frame and a universally movable camera mounted therein with the axis of its lens vertically disposed, and to rotate about such axis, said camera being adapted to rock in two vertical planes normal to each other, of a vertically disposed rotary controlling device similarly mounted in the frame for universal rocking movement, and connections between the controlling device and camera for communicating the rocking and rotary movements of the former to the latter.

3. In an aerial photographic apparatus, the combination with a horizontal main frame, of an outer frame pivoted thereto to swing in a vertical plane, an inner frame pivoted to the outer frame to swing in a vertical plane normal to the first, a controlling device for operating the two pivoted frames, and a camera carried by the inner frame with its optical axis vertically disposed.

4. In an aerial photographic apparatus, the combination with a horizontal main frame, of an outer frame pivoted thereto to swing in a vertical plane, an inner frame pivoted to the outer frame to swing in a vertical plane normal to the first, a camera carried by the inner frame with its optical axis vertically disposed and a controlling device for operating the two pivoted frames jointly or independently.

5. In an aerial photographic apparatus, the combination with a horizontal main frame, of an outer frame pivoted thereto to swing in a vertical plane, an inner frame pivoted to the outer frame to swing in a vertical plane normal to the first, a camera disposed with its optical axis vertical and rotatably mounted on the inner frame to turn about such axis and a controlling device connected to selectively rotate the camera and tilt the respective pivoted frames.

6. In an aerial photographic apparatus, the combination with a horizontal main frame, of an outer frame pivoted thereto to swing in a vertical plane, an inner frame pivoted to the outer frame to swing in a vertical plane normal to the first, a camera disposed with its optical axis vertical and rotatably mounted on the inner frame to turn about such axis and a controlling device connected to selectively rotate the camera and tilt the respective pivoted frames, said controlling device comprising inner and outer frames pivoted to the main frame and to each other on relatively transverse horizontal axes, a hand wheel rotatable on the inner frame on a vertical axis and connections between the hand wheel and the camera and its carrying frames to operate the camera with its axis always in parallelism with the axis of the hand wheel.

7. In an aerial photographic apparatus, the combination with a horizontal main frame, of an outer frame pivoted thereto to swing in a vertical plane, an inner frame pivoted to the outer frame to swing in a vertical plane normal to the first, a camera disposed with its optical axis vertical and rotatably mounted on the inner frame to turn about such axis and a controlling device connected to selectively rotate the camera and tilt the respective pivoted frames, said controlling device comprising inner and outer frames pivoted to the main frame and to each other on relatively transverse horizontal axes, a hand wheel rotatable on the inner frame on a vertical axis and connections between the hand wheel and the camera and its carrying frames to operate the camera with its axis always in parallelism with the axis of the hand wheel, and a view finder having its optical axis substantially coincident with the axis of the hand wheel.

8. In an aerial photographic apparatus, the combination with a horizontal main frame, of an outer frame pivoted thereto to swing in a vertical plane, an inner frame pivoted to the outer frame to swing in a vertical plane normal to the first, a camera disposed with its optical axis vertical and rotatably mounted on the inner frame to turn about such axis, a controlling device comprising a rotary member turning on a vertical axis and also mounted on two axes to tilt universally in vertical planes, means connecting the rotary member and the camera to rotate the latter and also tilt one of the pivoted frames through the medium thereof and a crank connection between the rotary member and the pivoted frame.

9. In an aerial photographic apparatus, the combination with a frame and a camera movably mounted thereon, of an operating member on the frame controlling the movements of the camera and a view finder carried by the operating member.

10. In an aerial photographic apparatus, the combination with a frame and a camera movably mounted thereon with its optical axis substantially vertically disposed, of a rotary operating member on the frame controlling the movements of the camera and arranged to turn on a substantially vertical axis, the camera and operating member being connected to maintain their axes in parallelism, and a view finder carried by the operating member with its optical axis substantially coincident with the turning axis of the latter.

11. In an aerial photographic apparatus, the combination with a frame and a camera mounted thereon with its optical axis tilted at an angle to the vertical of a view finder on the frame having its optical axis vertically disposed and a mirror on the finder projecting into the field thereof and arranged at an angle to the axis of the finder that is one half that of the said axes to each other.

12. In an aerial photographic apparatus, the combination with a frame and a camera movably mounted thereon with its optical axis at an angle to the vertical, of a combined operating member and view finder on the frame connected for coordinate movement with the camera and having its optical axis vertically disposed, and a mirror on the finder projecting into the field thereof and arranged at an angle to the axis of the finder that is one half that of the said axes to each other.

13. In an aerial photographic apparatus, the combination with a frame and a camera movably mounted thereon, of a combined operating member and view finder on the frame having its optical axis vertically disposed, interchangeable operating connections between the camera and operating member for coordinating their movements with the axis of the camera disposed, respectively, parallel with that of the finder or at an angle thereto, and a displaceable mirror on the finder projecting into the field thereof and arranged at an angle to the axis of the finder that is one half that of the said axes to each other.

BENJAMIN DAY CHAMBERLIN.